Aug. 29, 1961  F. W. R. STARP  2,997,936
PHOTOGRAPHIC CAMERA
Filed July 15, 1959
2 Sheets-Sheet 1
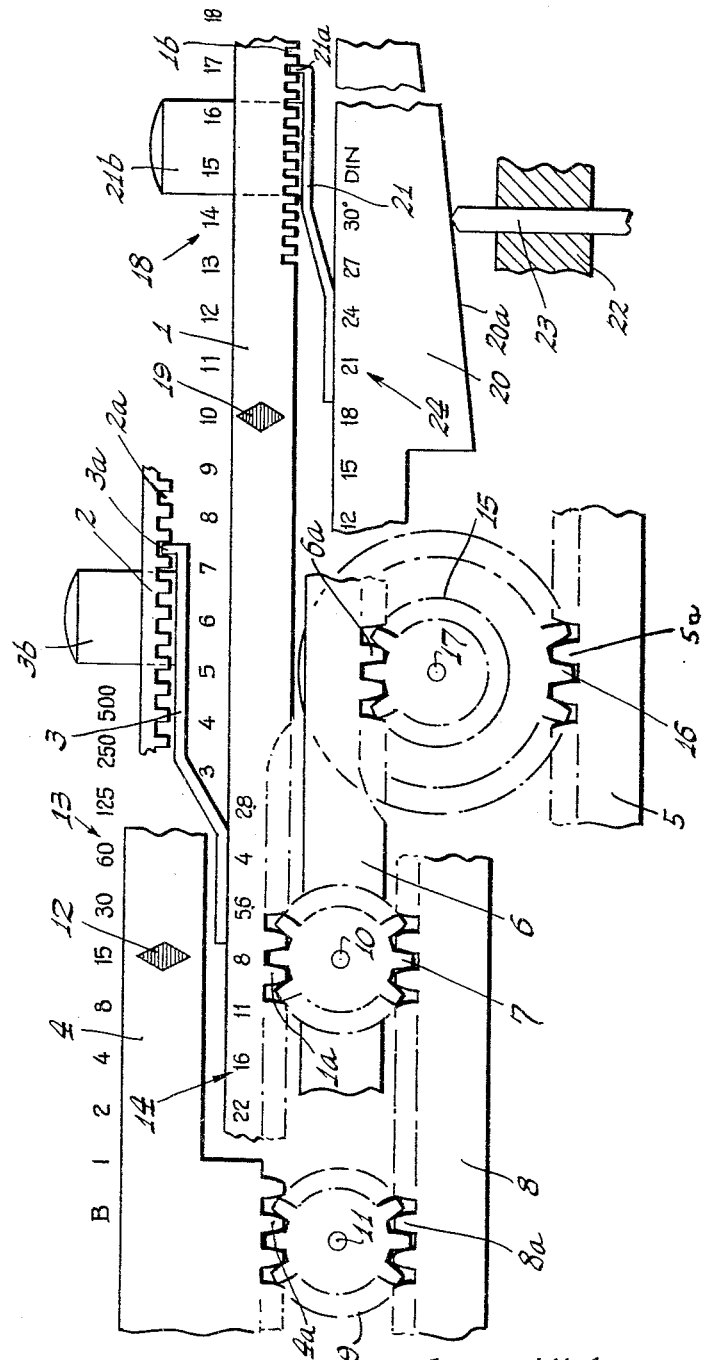
INVENTOR
Franz Wilhelm Reinhard Starp
BY
Munn, Liddy, Daniels & March
ATTORNEYS

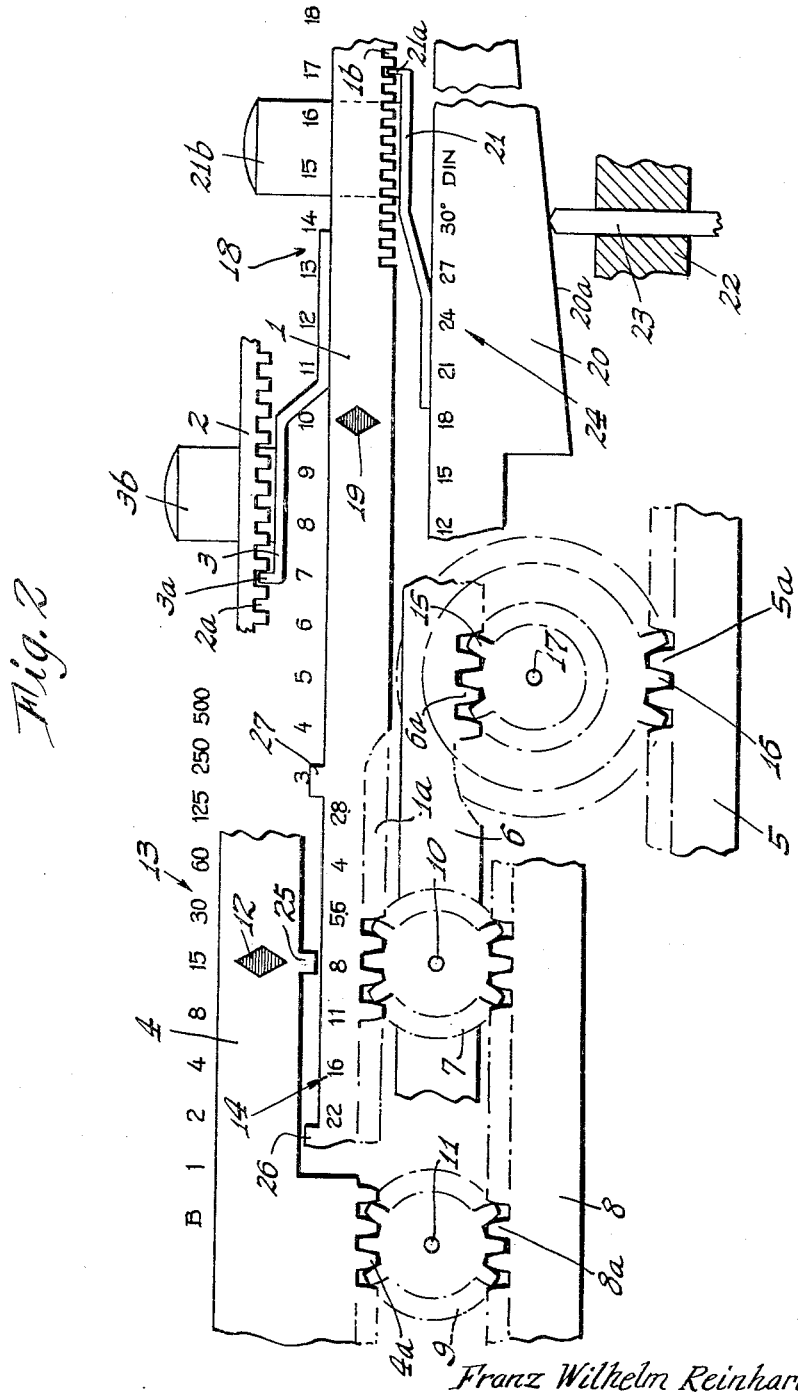

United States Patent Office 2,997,936
Patented Aug. 29, 1961

2,997,936
PHOTOGRAPHIC CAMERA
Franz Wilhelm Reinhard Starp, Calmbach, Enz, Germany, assignor to Alfred Gauthier G.m.b.H., Calmbach, Enz, Germany, a corporation of Germany
Filed July 15, 1959, Ser. No. 827,323
Claims priority, application Germany July 24, 1958
8 Claims. (Cl. 95—64)

This invention relates to the type of photographic camera wherein the diaphragm and speed setting members are coupled to one another by a differential gear in a manner such that shifting or adjustment of the said members both with respect to exposure-values and with respect to speed-diaphragm ratios is possible while the exposure value of the camera remains constant.

Differential gear couplings between the speed and diaphragm setting members of a camera have been well known in the art for a considerable period of time. However, the mode of operation and method of setting differential-gear coupled members has been generally unsatisfactory, for the reason that the exposure-value setting member has a smaller adjusting or setting velocity than the speed and/or diaphragm setting members, and for the reason that the setting scales for speed and diaphragm read in opposite directions and the associated setting members move in opposite directions. By virtue of the fact that the speed of movement of the exposure value setting member is less than that of the speed and diaphragm setting members there is a disadvantage in that the small movements which are required of the exposure-value setting member must be dealt with and considered, and in that there is a consequent inaccuracy in the settings of such member. Also, the opposite directions of movements of the diaphragm and speed setting members and the opposite reading of the scales for these members make it difficult to pair the speed and diaphragm values associated with a specific exposure value. These disadvantages can be overcome by a suitable arrangement of transmission and reversing gears, but this necessitates the provision of an appreciable number of structural members and requires a corresponding amount of space for the same. In addition, the play or lost motion which results from the use of a large number of gear members may further impair the setting accuracy of the arrangement.

An object of the present invention is to provide a differential-gear type of coupling between the speed and diaphragm setting members of the kind set forth above, which obviates the aforementioned disadvantages.

This is accomplished, in accordance with the invention, by providing the planetary gear on an adjustable carrier which is connected to one of the setting members for speed and diaphragm, the said planetary gear meshing with the exposure value setting member on the one hand and with the other one of the speed-diaphragm setting members on the other hand. Also, the connection of the planetary gear with the said one of the two setting members is established through the intermediary of a reversing gear, by which the said one setting member is made to travel in the same direction and at the same rate as the other setting member when the carrier for the planetary gear is held motionless.

By the provision of such a planetary-gear coupling there is obtained the important advantage that the rate of the adjusting movement of the exposure-value setting member is the same as the rate of movement of one of the setting members for shutter speed and diaphragm. This results in a further advantageous action in that the force (or torque) required to adjust or shift the exposure value setting member is substantially less than that now required in well-known devices and ordinary planetary coupling means. In addition, the setting accuracy of the exposure-value setting member is commensurate with that one of the setting members for shutter speed or diaphragm which is connected to the exposure-value setting member through the medium of the planetary gear, and this is of distinct advantage when compared with existing devices of this type. It is of further importance, in accordance with the invention, that the above advantages are obtained by the use of relatively few parts, in a simple and economical manner.

Also, in accordance with the present invention there is provided an especially favorable and clearly visible method of adjusting the speed and diaphragm setting members, in that the exposure value setting member and whichever one of the speed or diaphragm setting members is connected thereto by means of the planetary gear are disposed adjacent one another, the said one setting member carrying an index mark adapted to cooperate with a speed scale and also a diaphragm scale, both of which may have the same graduations, one of said scales being stationary or fixed whereas the other scale is carried by the exposure-value setting member.

This organization is characterized by the fact that the mated or paired speed-diaphragm values associated with a specific exposure value can be seen and grasped at a glance, when selecting the speed and diaphragm settings of the camera.

With the above general construction and mode of operation as provided by the invention the adjusting force or turning moment required to shift the setting members is not always constant or uniform over their entire range of adjustment. Even though only relatively low values, representing the maximum adjusting force or turning moment are required, the difference in force which occurs during shifting of the setting members throughout the entire range of values is noticeable, and may be considered at times to interfere with the uniformly easy adjustment or setting of the camera by the operator. Also, where simple production-type gear elements and components are utilized in the fabrication of the setting device there is generally an unavoidable play or looseness in the gear connections during the simultaneous adjustment of the exposure-value setting member and one or the other of the shutter-speed or diaphragm setting members. It may be found that one of the setting members either leads or lags the other by a small amount, depending to an extent upon the accuracy and cooperable relationships of the geared elements, and this might under certain circumstances cause a small yet noticeable error in the indication or adjustment of one of the setting members, especially near the end of the range of adjustment.

In accordance with the present invention there is provided a novel and improved setting or adjustment means having planetary gearing in an organization as above outlined with the attendant advantages thereof, wherein the adjustment or shifting of the exposure-value setting member and also the shutter-speed and/or diaphragm setting member is characterized by an advantageous ease and uniformity over the entire adjustment range, and wherein even small errors with respect to the setting and indication of the setting members are avoided.

In accomplishing this, in accordance with the invention, the driving mechanism which is arranged between the exposure-value setting member and either the shutter-speed or else the diaphragm setting member is so constituted that, upon a further adjustment or shifting of one of the latter setting members after reaching the limit of the diaphragm and/or shutter-speed range, a direct drive will be established by such mechanism between the exposure-value setting member and that setting member which is coupled to it through the medium of the planetary gear.

By the provision of the said direct driving connection between the setting members there is required an appreciably less adjusting force for actuating the exposure-value setting member after the associated setting member which is coupled through the intermediary of the planetary gearing has reached the end of its adjusting range. This same diminution in actuating force is obtained when adjusting either the shutter-speed setting member or the diaphragm setting member, as the setting member not being shifted reaches the limit of its adjusting range.

The reduction in the force required to shift the setting member results from the fact that when the above-mentioned limits of adjustment are reached the movements of one member are transmitted directly to the other member, and the planetary gear is merely carried along and is not called upon to effect any transmission of movement. Accordingly, by this organization there is insured at all times a method of actuation characterized by the adjusting force required for the various partial adjusting ranges of the setting members being as small as possible, thereby resulting in an advantageous, comparatively smooth and uniform adjustment of the members over their entire range. This is not only an important advantage where manual setting operations are required, but is also of considerable advantage where automatic exposure settings are utilized, as for example in cameras having automatic exposure regulators.

In addition to the above advantages, the provision of the direct-acting driving connection as above set forth results in a greater setting and indicating accuracy than where such connection is not provided, since the direct-acting driving connection eliminates as factors all looseness and play causing inaccuracies which often characterize gear drives and the like.

A particularly advantageous embodiment of the invention illustrating one type of direct-drive is described below, the said embodiment being characterized by relatively few structural members, together with an economy of space and economy of manufacture. The said embodiment further involves a simple construction and one which is functionally reliable at all times, this being effected by constituting the driving mechanism as a lug or projection which is mounted on one of the setting members and which serves to abut or cooperate with two other stops or projections spaced from one another and provided on the other setting member. One of said setting members could be constituted either as the shutter-speed or else the diaphragm setting member, whereas the other setting member would comprise the exposure-value setting member.

Other features and advantages resulting from the novel structures provided by the invention will become apparent from the following specification, which explains two specific embodiments which are illustrated to an extent diagrammatically in the drawings.

In the accompanying drawings, FIGURE 1 is a diagrammatic representation of a camera adjusting or setting mechanism as provided by the invention, the coupling of said mechanism to an exposure meter or regulator being only partially shown.

FIGURE 2 is a view similar to FIGURE 1, but illustrating another embodiment of the invention wherein means are provided for effecting a direct-acting drive connection between two of the setting members. In both the above figures, components which are similar have been designated by like characters.

For purposes of clarity of illustration all structural members of the camera which form no part per se of the invention have been omitted; also, in order to further simplify the showing, the speed, diaphragm, and exposure-value setting members have been illustrated as longitudinally shiftable, slide-like structures rather than as turnable rings. This representation, however, is in no way intended to limit the construction of these setting members; on the contrary, in a camera as provided by the invention, the said setting members may be developed in any suitable manner, i.e., for example as either slides, rings or discs.

Referring now to FIGURE 1 of the drawings, the exposure-value setting member is indicated by the numeral 1. This member may be releasably held in various, different settings or positions in a well-known manner, by means of a detent means or locking device having notches or recesses 2a adapted to receive a tooth or projection 3a of a locking leaf spring 3. The recesses 2a are provided in a fixed rail or member 2, whereas the leaf spring 3 is carried by or connected to the exposure-value setting member 1. The locking of the member 1 is effected when the projection or tooth 3a of the spring 3 is received in one of the recesses 2a, and for the purpose of actuating the locking spring 3 there is provided thereon a finger-piece 3b. The exposure-time or speed setting member of the camera is indicated by the numeral 4, and 5 indicates the diaphragm setting member. The setting members 4 and 5 enable different shutter speeds and/or different diaphragm openings to be obtained in a well-known manner.

In accordance with the present invention, a planetary gear 7 is provided on an adjustable carrier member 6 which is connected to the diaphragm setting member 5, said planetary gear meshing with the exposure-value member 1 on the one hand and being connected with the speed setting member 4 on the other hand.

The connection between the planetary gear 7 and the speed setting member 4 is effected through the medium of a reversing gear drive comprising a rack 8 and a fixedly positioned gear 9 which meshes with the rack, the gear 9 also meshing with the setting member 4 and effecting a movement of the latter which is of the same magnitude and has the same direction as the movement of the exposure-value setting member 1 when the carrier 6 for the planetary gear 7 is held fixed or motionless.

In effecting the above-mentioned connections, the exposure-value setting member 1, the rack 8 and the speed setting member 4 are provided with gear teeth 1a, 8a, and 4a respectively. The planetary gear 7 which is mounted on the carrier 6 is pivotally carried by a spindle 10, and the reversing or idler gear 9 is mounted on a fixed spindle 11.

The members 6 and 8 may be constituted in different ways, just as with the setting members 1, 4 and 5; that is, the members 6 and 8 may be constituted as either slides, rings, or discs. Also, instead of interposing the reversing gearing between the planetary gear 7 and the speed setting member 4, the latter may engage the planetary gear 7 directly, and instead the exposure-value setting member 1 may be coupled to the planetary gear 7 by means of reversing gearing similar to the rack 8 and idler gear 9. The functions of the speed and diaphragm members 4 and 5 respectively are also interchangeable, as will be understood.

Further, in accordance with the present invention, an easily observable arrangement of the shutter speed and diaphragm settings is provided by the adjoining disposition of the exposure-value setting member 1 and the speed setting member 4, as shown; in addition, the speed setting member 4 is provided with an index mark 12 cooperating with both a speed scale 13 and a diaphragm scale 14, the said scales having the same graduations. That is, the spacings of the marks making up the scales 13 and 14 are arranged to be identical. The speed scale 13 is fixedly mounted, whereas the diaphragm scale 14 is carried by the exposure-value setting member 1.

In the illustrated embodiments of the invention, the connection between the planetary gear carrier 6 and the diaphragm setting member 5 is effected by the provision of an intermediary or idler gear, also termed herein a transmission gear. The transmission gear is constituted of two gear wheels 15 and 16 of different diameters, the said wheels being fixedly secured to each other and being turnable about a fixed spindle 17. The gear 15 meshes with teeth 6a on the planetary gear carrier 6, whereas the gear 16 meshes with teeth 5a of the diaphragm setting member 5.

The interposition of the transmission gear 15, 16 between the members 6 and 5 enables the diaphragm setting member 5 to have a different travel and rate of adjusting movement, as compared with that of the planetary gear carrier 6. As shown in the drawings, the two adjusting speeds and travels have the ratio 1:2; that is, the diaphragm setting member moves at twice the rate as the carrier 6, and therefore has the same rate of travel or adjustment as the shutter-speed and exposure-value setting members. By this organization of the transmission gear 15, 16 there is had the advantage that the adjusting speed or velocity which is most suited to each particular case can be associated with the diaphragm setting member 5, and the selection of that velocity may be completely independent of the adjusting speed or velocity of the other setting member by suitably selecting the sizes of the gears of the transmission. This is of especial importance where the invention is to be utilized in a camera having an adjusting characteristic of the diaphragm setting member which may not be readily changed or altered. Such a circumstance, for example, would be encountered in the case of a camera having interchangeable lenses wherein the diaphragm is built into the lenses; with the illustrated embodiment of the invention, the transmission gear 15, 16 is arranged to accommodate interchangeable lens assemblies as just referred to.

In the event that the ratio-type transmission between the planetary gear carrier 6 and the diaphragm setting member 5 is dispensed with, a simplified construction may be obtained in accordance with the invention by connecting the diaphragm setting member 5 directly to the planetary gear carrier 6 (or connecting the speed setting member 4 directly to the planetary gear carrier 6 where the speed and diaphragm members are interchanged).

The various settings or adjustments of the exposure-value setting member 1 may be effected in a well-known manner, by reference to an exposure-value scale 18 which is preferably fixedly secured or mounted on the camera, the member 1 being provided with an index mark 19 for cooperation with the scale 18. Such organization of the scale 18 and index mark 19, in conjunction with the arrangement of the scales 13, 14 and the index mark 12 provides an easily understandable and readable arrangement, since it avoids the use of two relatively long scales being required on the exposure value setting member 1.

In connection with the above-mentioned advantages of the invention there is obtained a favorable, especially simple and readily visualized method of setting the exposure-value member 1, by coupling the latter with an exposure meter which is responsive to existing light conditions, in a well-known manner. When this is done, the exposure-value setting scale 18 may be dispensed with, and the correct setting or position of the member 1 corresponding to the prevailing light conditions is obtained, for example, by effecting a coincidence between the reset or adjusting pointer associated with the exposure meter and a measuring or indicating pointer of the meter. Due to the relatively great adjusting movement of the setting member 1 and the relatively small adjusting forces required in shifting the member, the said coincidence between the pointers may be readily effected in a particularly convenient and accurate manner.

FIGURE 1 of the drawings further shows how it is possible to take into consideration, where an exposure meter is utilized in conjunction with the setting member 1, exposure factors other than the shutter speed and diaphragm, all in a simple, readily understandable and easily viewed manner. One such additional exposure factor, for example, may be that of film sensibility or sensitivity. In order to take the film sensibility into account, there is provided a member 20 which is movable and adjustable with respect to the exposure-value setting member 1. The member 20 is interposed in the coupling connection between the setting member 1 and an exposure meter and carries a film sensibility scale 24 arranged to cooperate with the above-mentioned index mark 19 on the exposure-value setting member 1. The member 20 may be constructed either as a slide, or else as a ring or disc, as will be readily understood, and may be connected with the exposure-value setting member 1 in different relative positions by means of a releasable coupling device. Such a coupling device may comprise notches or recesses 1b provided in the exposure-value setting member 1, and may further comprise a tooth or projection 21a provided on a leaf spring 21 which is mounted on the member 20 and arranged to be actuated by a finger piece 21b.

For the purpose of actuating a well-known transmission means or device by which shifting movement of the exposure-value setting member 1 causes a corresponding movement or actuation of the settable pointer of the exposure meter (not shown in the figures) the member 20 may have a cam edge 20a provided on it, for engagement by an axially shiftable transmission pin 23 carried in a guide or bearing 22 and disposed adjacent the cam edge 20a. The transmission pin 23 may be thought of as constituting the first member or link of the transmission means between the exposure value setting member 1 and cam 20, and the settable member or pointer of the exposure meter.

A transmission means and exposure meter similar to that illustrated and described in my copending application Serial Number 639,993, filed February 13, 1957 and entitled Photographic Intra-Lens Shutter and Coupled Exposure Meter but not having a film sensibility scale may be utilized with the present camera setting structure.

The operation of the camera as illustrated in FIG. 1 of the drawings is as follows:

(1) Setting for a specific exposure value. After adjustment has been made for the proper film sensibility, by means of the coupling connection 1b, 21, the detent device 3, 2a of the exposure-value setting member 1 is released, and the said member is adjusted by means of the scale 18 and index mark 19 to the proper value as obtained, for example, from an exposure meter, or else as determined by estimates or by effecting a coincidence of the associated pointers of the exposure meter (in the case where the member 1 is coupled to the exposure meter through the cam 20, 20a and transmission pin 23). In effecting this setting, either one or else both of the setting members 4 and 5 may be shifted to establish a specific time-diaphragm pair, that is, to produce a predetermined or mated time-diaphragm relationship.

The appreciable extent of movement of the setting member 1 as it is shifted from one exposure value to another produces an easily readable indication and also requires relatively little motivating force. This is especially true if the speed and diaphragm setting members are associated with the planetary gear 7 and gear carrier 6 in the manner shown in FIG. 1. The adjustment ratio between the speed setting member 4, which is generally more difficult to adjust than the diaphragm setting member 5, and the exposure-value setting member 1 is in the present instance 1:1; consequently, in view of the relatively small adjusting force which is required for setting the diaphragm, the adjusting force necessary to shift the exposure-value setting member 1 is not substantially greater than that require for shifting the speed setting member 4.

As compared with existing, well-known setting devices employing planetary gearing, the present setting means as provided by the invention, has an especial advantage, both with respect to the accuracy of adjustment of the exposure-value setting member 1 and also with respect to the actuating force which is required to effect shifting of the said setting member.

(2) Selection of a specific pair of shutter-speed and diaphragm values.

After the exposure-value setting has been effected in accordance with (1) above, the setting member 1 is retained in its adjusted position by means of the detent device 2a, 3. The paired values of shutter speed and diaphragm which are best suited to the object which is to be photographed are then selected, by rotating either the speed setting member 4 or else the diaphragm setting member 5, the adjustment of the speed setting member being preferred generally. This setting operation may be readily carried out, since the index mark 12 which is carried by the speed setting member 4 is movable along the fixed speed scale 13 and also along the diaphragm scale 14 which now is also fixed by virtue of the fact that the exposure-value setting member 1 is retained in its previously adjusted position by the detent 2a, 3. The mutually associated or correlated values of speed and diaphragm, which produce a similar or equal exposure of the film, are disposed directly opposite each other, so that the various paired values may be seen at a glance even in the absence of any movement of the index mark 12 in traversing the scales.

The above-described arrangement of the scales 13, 14 and 18, 24 in conjunction with the index marks 12 and 19, providing the advantageous and easily accomplished adjustment of the setting members of the camera, provides a distinct advance and improvement in camera adjustment, as compared with prior setting devices of existing cameras.

In the embodiment of the invention illustrated in FIGURE 2 a novel and direct drive connection is established between two of the setting members when one member reaches the end or limit of its adjusting range, thereby to reduce the shifting force required in adjusting the setting members and render the same as uniform as possible over the entire range. Specifically, in FIGURE 2, such action involves the speed setting member 4 and the exposure-value setting member 1. With such direct-acting drive a further adjustment of one of the setting members after, for example, a limit of movement of the diaphragm has been reached, will cause the direct-acting drive mechanism to become operative whereby the said further movement of the one setting member will directly drive the other setting member without involving the intermediary of the planetary gearing.

FIGURE 2 shows a particularly advantageous direct-drive mechanism which is of simple construction, and which does not require any additional space.

As shown therein, the direct driving connection comprises a lug or projection 25 which is provided on the speed setting member 4, and which serves to cooperate with two lugs or stops 26 and 27 provided on the exposure-value setting member 1, the stops 26 and 27 being spaced from each other at a distance which corresponds to the total diaphragm adjusting range.

By thus directly driving one of the setting members when operating the other setting member there is overcome or diminished the additional resistance represented by the gear connection involving the planetary gearing, and instead there remains but small losses due to friction or the like. The increased force required where the planetary gear is used as an intermediary, as in the embodiment of the invention illustrated in FIGURE 1, results from the fact that the efficiency of the transmission is not perfect, even if frictional factors are neglected. Another reason for increased transmission losses when using the planetary gear as an intermediary device is due to the elastic deformation of the members of the transmission when there is a comparatively great adjusting force applied to one of the setting members. Such comparatively great adjusting force, for example, would be required where the exposure-time setting member is arrested or adjusted in a selected, marked position. This type of deformation is especially likely to occur if the individual structural members must be arranged in a compact manner, to save space, as for example in cameras of the type employing intra-lens shutter assemblies.

Accordingly, the advantage of the direct drive as provided by the invention, wherein the adjusting forces required are limited to values corresponding substantially to the sum of the separate adjusting forces of the setting members 1 and 4, is thus seen to be of considerable importance.

In addition to the above, the direct driving connection between the setting members 1 and 4, which connection becomes operative after one of the limits of the diaphragm adjusting range has been reached, results in the further advantage of increased indicating and/or setting accuracy for the setting members. This advantage is of special importance if the exposure-value setting member is to be shifted into its end position by means of the shutter-speed setting member, or vice versa. In the embodiment of the invention illustrated in FIGURE 1, the indirect actuation of the setting members through the intermediary of the planetary gear is not always favorable in accurately attaining the end positions, since this may be to a great extent defeated by the unavoidable looseness or play within the transmission gear.

In place of the arrangement shown in FIGURE 2 wherein the spaced stops 26, 27 are on the member 1 and the single stop or lug 25 is on the member 4, a different arrangement may be provided, having the single lug 25 mounted on the exposure-value setting member 1 whereas the spaced stops 26, 27 are provided on the speed setting member 4. The advantages resulting from this arrangement are the same as with that shown.

In the case of the embodiment of the invention shown in FIG. 2, if one of the limits of the diaphragm adjusting range, i.e., either the diaphragm value 2.8 or else the value 22 is attained in the course of the setting operation for effecting a specific exposure value by shifting the member 1 with the detent 2, 3 released, this occurring without the said exposure value which is appropriate for the exposure to be made being attained, the setting operation is continued by moving the member 1, but now with the diaphragm limit being retained by virtue of engagement of the lug 25 with one of the lugs 26, 27. Therefore, only the shutter speed is changed, during such continuation of the setting operation. This causes the direct-drive mechanism as provided by the invention to become operative to the exclusion of the planetary gear mechanism, and results in the above-described advantages of a high adjusting accuracy and relatively low, uniform actuating force.

Regarding the embodiment of the invention shown in FIG. 2, a selection of a specific pair of speed-diaphragm values is carried out as follows: After the exposure-value setting has been effected in the aforementioned manner, the setting member 1 is secured in its adjusted position by means of the detent mechanism 2a, 3. The pair of speed-diaphragm values best suited to the object to be photographed can then be selected by rotating the speed setting member 4. Owing to the detent mechanism 2a, 3, the shifting movement of the speed setting member will terminate when one of the limits of the shutter-speed or diaphragm adjusting range has been attained.

As distinguished from the embodiment of the invention illustrated in FIG. 1, the use of a releasable detent device in connection with the exposure-value setting member 1 may be dispensed with. Although this will do away with the absolute operational reliability with respect to the speed-diaphragm selection, it will enable an exposure-value setting to be obtained by means of a speed setting member, in addition to the speed-diaphragm selection. The said exposure-value setting will take place when the speed setting member 4 is adjusted while the diaphragm limit value, i.e., 2.8 or 22 is maintained constant by virtue of engagement of the lug 25 with one of the lugs 26, 27. In such circumstance the advantages as provided by the invention are still retained, because the direct-driving connection between the setting members 1 and 4 results in the smallest possible adjusting force being required for shifting the speed setting member 4.

The use of the invention is not limited to any specific type or species of camera; on the contrary, the invention has utility and provides important advantages in cameras of every type and construction and especially cameras having interchangeable lens assemblies.

I claim:

1. In a photographic camera, in combination, a pair of setting members comprising a diaphragm setting member and a speed setting member; a planetary gear; a movable carrier on which the planetary gear is rotatably mounted; means connecting said carrier to one of said pair of setting members for concurrent movement therewith; an exposure-value setting member; means connecting the exposure-value setting member to the planetary gear for actuation in response to turning of said gear while the said carrier is stationary; and means including a reversing gear mechanism, coupling the other of said pair of setting members to the planetary gear to effect similar movements of the said other setting member and the exposure-value setting member when the planetary gear is turned and the carrier held stationary, said movements being in the same direction and having the same magnitude.

2. The invention as defined in claim 1, in which the exposure-value setting member and the said other of the pair of setting members are disposed adjacent each other, and in which there is a speed scale and a diaphragm scale having similarly spaced graduations, one of said scales being fixed and the other being carried by the exposure-value setting member, said other of the setting members having an index mark cooperable with the said scales.

3. The invention as defined in claim 1, in which the means connecting the said carrier to the one setting member of the pair includes a transmission gear mechanism by which the ratio of movements of the carrier and member may be controlled.

4. The invention as defined in claim 1, in which there is a fixed exposure-value scale, and in which the exposure-value setting member has an index mark cooperable with the said scale.

5. The invention as defined in claim 1, in which there is coupling means including a transmission mechanism for coupling the exposure-value setting member to an exposure meter.

6. The invention as defined in claim 5, in which there is a member which is adjustable with respect to the exposure-value setting member, disposed in the coupling means, and in which one of said members has a setting scale and the other member has an index mark cooperable with the setting scale, for taking into consideration other exposure factors.

7. The invention as defined in claim 1, in which there is a driving mechanism between the exposure-value setting member and the said other of the pair of setting members, said mechanism effecting a direct drive when one of the pair of setting members reaches a limit of its adjusting movement and either the exposure-value setting member or the said other of the pair of members is shifted further.

8. The invention as defined in claim 7, in which the driving mechanism between the specified members comprises a projection on one member and a pair of spaced cooperable projections on the other member, the spacing between the pair of projections corresponding to the adjusting range of the said other of the pair of setting members.

References Cited in the file of this patent

UNITED STATES PATENTS 2,418,370     Simmon _____ Apr. 1, 1947